United States Patent
Hyodo

(10) Patent No.: US 6,219,463 B1
(45) Date of Patent: Apr. 17, 2001

(54) IMAGE READING DEVICE CAPABLE OF OBTAINING AN ACCURATE IMAGE

(75) Inventor: Haruhiro Hyodo, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/003,585

(22) Filed: Jan. 6, 1998

(30) Foreign Application Priority Data

Jan. 7, 1997 (JP) ................ 9-000576
Dec. 15, 1997 (JP) ................ 9-345237

(51) Int. Cl.⁷ ................................ G06K 9/32
(52) U.S. Cl. ................ 382/298; 382/321; 358/486
(58) Field of Search ................ 382/298, 321, 382/312, 317; 358/449, 451, 487, 497, 486; 348/745

(56) References Cited

U.S. PATENT DOCUMENTS

| | | | |
|---|---|---|---|
| 4,321,628 | 3/1982 | Crean | 358/293 |
| 4,750,048 * | 6/1988 | Satoh et al. | 358/287 |
| 4,751,376 * | 6/1988 | Sugiura et al. | 250/201 |
| 5,101,282 * | 3/1992 | Honma | 358/451 |
| 5,132,810 * | 7/1992 | Kishida | 358/451 |
| 5,161,029 * | 11/1992 | Yamanishi | 358/451 |
| 5,333,066 | 7/1994 | Sugata | 358/471 |
| 5,335,093 * | 8/1994 | Imoto | 358/487 |
| 5,483,299 * | 1/1996 | Minoura | 348/745 |
| 5,486,895 * | 1/1996 | Leidig et al. | 355/50 |
| 5,568,273 * | 10/1996 | Sato et al. | 358/451 |

FOREIGN PATENT DOCUMENTS 05130338   5/1993   (JP).

* cited by examiner

Primary Examiner—Yon J. Couso
(74) Attorney, Agent, or Firm—McDermott, Will & Emery

(57) ABSTRACT

There is provided an image reading device capable of preventing disorder of an aspect ratio of an image even when a reading magnification ratio deviates from a set value due to a mechanical error and easily obtaining an accurate image. In this image reading device, a reference mark and a center mark of a line pattern of a reference pattern are projected on a CCD by a zoom lens, and an actual projection magnification ratio of the zoom lens is detected by use of addresses of pixels corresponding to a projection image. Then, a sub-scanning speed calculating section calculates a sub-scanning speed corresponding to the detected actual projection magnification ratio and drives a sub-scanning motor. Therefore, the sub-scanning speed corresponding to the actual projection magnification ratio is set regardless of the presence or absence of a magnification ratio error attributed to a mechanical error in a zooming stage on the lens side, thereby allowing an image accuracy to be guaranteed.

23 Claims, 7 Drawing Sheets

IMAGE READING DEVICE CAPABLE OF OBTAINING AN ACCURATE IMAGE

This application is based on application No. 9-345237 filed in Japan, the content of which is hereby incorporated by reference.

BACKGROUND OF THE INVENTION

The present invention relates to an image reading device including a reading optical system which is able to read an image with a variable magnification.

In an image reading device including a reading optical system which is able to read an image with a variable magnification, a sub-scanning speed is determined at a designated magnification ratio (set value). This magnification ratio may be made variable by means of a zoom lens or made variable by moving the conjugation length of a single-focus lens.

However, in a case where the zoom lens is used or in a case where the single-focus lens is used, there is a problem that, when a reading magnification ratio deviates from the set value due to a mechanical error and the sub-scanning speed is determined with the designated magnification ratio kept intact, a state in which the aspect ratio of an image is disordered occurs as a consequence of a change of a relative relation between a sub-scanning magnification ratio and a main scanning magnification ratio since a line cycle of a main scanning is constant.

Particularly when executing partial magnification of an image, in general, it is often the case where a magnification ratio considerably greater than the magnification ratio in the case of normal paper size change is set. In this case, an error of the aspect ratio of the image tends to become relatively conspicuous on the image.

SUMMARY OF THE INVENTION

In view of the above, the object of the present invention is to provide an image reading device capable of preventing the disorder of the aspect ratio of an image even when the reading magnification ratio deviates from a set value due to a mechanical error and easily obtaining an accurate image.

In order to achieve the above object, there is provided an image reading device comprising:
an image reading unit which extends in a main scanning direction;
a projecting device which projects an image of an original document on the image reading unit;
a moving device which moves the image reading unit in a sub-scanning direction relative to the original document;
a magnification ratio detecting device which detects a magnification ratio of an image projected by the projecting device; and
a sub-scanning travel speed controlling device which controls a travel speed in the sub-scanning direction by means of the moving device according to the detected magnification ratio.

In the image reading device of the first aspect of the present invention, the magnification ratio detecting device detects the actual projection magnification ratio by the projecting device, and the sub-scanning travel speed controlling device controls the sub-scanning speed of the moving device in the sub-scanning direction to the sub-scanning speed corresponding to the projection magnification ratio.

As described above, according to the first aspect of the present invention, the sub-scanning travel speed controlling device controls the sub-scanning speed based on the actual projection magnification ratio detected by the magnification ratio detecting device. This arrangement is capable of setting the sub-scanning speed corresponding to the actual projection magnification ratio regardless of the presence or absence of a magnification ratio error attributed to a mechanical error in the zooming stage on the lens side, preventing respective relative deviations of a sub-scanning magnification ratio and a main scanning magnification ratio and preventing the disorder of the aspect ratio of the image, thereby allowing an accurate image to be obtained.

In an embodiment of the present invention, the image reading unit is a plurality of CCDs arranged in a linear form.

In an embodiment of the present invention, the projecting device is a zoom lens.

In an embodiment of the present invention, the projecting device has a projection lens having a single focus and is able to change its projection magnification ratio by varying its conjugation length.

An embodiment of the present invention further comprises:
a designating device which designates the projection magnification ratio of the projecting device; and
a lens moving device which moves a lens included in the projecting device according to the designated magnification ratio.

According to the embodiment of the present invention, by designating the projection magnification ratio of the projecting device by the designating device and moving the lens included in the projecting device according to the projection magnification ratio by the lens moving device, the projection magnification ratio can be changed.

In an embodiment of the present invention, an image reading device comprises a reference mark to be projected on the image reading unit by the projecting device.

In an embodiment of the present invention, the magnification ratio detecting device detects the projection magnification ratio of the projecting device by means of information of an image of the reference mark.

According to the embodiment of the present invention, the magnification ratio detecting device can detect the actual projection magnification ratio from an image obtained by projecting the reference mark on the image reading unit by means of the projecting device.

In an embodiment of the present invention, the sub-scanning travel speed controlling device moves the image reading unit at a speed at which an image magnification ratio in the sub-scanning direction is the detected magnification ratio.

The present invention provides an image reading device comprising:
a line sensor which extends in a main scanning direction;
a zoom lens which projects an image of an original document on the line sensor while varying a projection magnification ratio;
a reference pattern arranged in the vicinity of the original document;
a moving device which moves the line sensor in a sub-scanning direction relative to the original document;
a magnification ratio designating device which designates a projection magnification ratio of the zoom lens;
a zooming device which executes zooming of the zoom lens according to the magnification ratio designated by the magnification ratio designating device;
a reading device which reads an image of the reference pattern projected by the zoomed zoom lens by means of the line sensor;

a magnification ratio calculating device which calculates a projection magnification ratio according to image information obtained by the reading device; and a sub-scanning travel speed controlling device which controls the moving device so that the line sensor moves in the sub-scanning direction relative to the original document at a speed corresponding to the calculated projection magnification ratio.

In an embodiment of the present invention, the line sensor has a plurality of CCDs.

In an embodiment of the present invention, an image reading device comprises a reference mark to be projected on the line sensor by the projecting device.

In an embodiment of the present invention, the magnification ratio calculating device detects the projection magnification ratio of the zoom lens by means of information of an image of the read reference mark.

In an embodiment of the present invention, the sub-scanning travel speed controlling device moves the line sensor at a speed at which an image magnification ratio in the sub-scanning direction is the detected magnification ratio.

The present invention provides an image reading device comprising:

a line sensor which extends in a main scanning direction;

a projection lens which projects an image of an original document on the line sensor;

a reference pattern arranged in the vicinity of the original document;

a sensor moving device which moves the line sensor in a sub-scanning direction relative to the original document;

a magnification ratio designating device which designates a projection magnification ratio of the projection lens;

a lens moving device which moves the projection lens according to a magnification ratio designated by the magnification ratio designating device;

a reading device which reads an image of the reference pattern projected by the moved projection lens by means of the line sensor;

a magnification ratio calculating device which calculates a projection magnification ratio according to image information obtained by the reading device; and a sub-scanning travel speed controlling device which controls the moving device so that the line sensor moves in the sub-scanning direction relative to the original document at a speed corresponding to the calculated projection magnification ratio.

In an embodiment of the present invention, the line sensor has a plurality of CCDs.

In an embodiment of the present invention, an image reading device further comprises a reference mark to be projected on the image reading unit by the projection lens.

In an embodiment of the present invention, the magnification ratio calculating device detects the projection magnification ratio of the projection lens by means of information of an image of the read reference mark.

In an embodiment of the present invention, the sub-scanning travel speed controlling device moves the line sensor at a speed at which an image magnification ratio in the sub-scanning direction is the detected magnification ratio.

The present invention provides an image forming device comprising:

an image reading unit which extends in a main scanning direction;

a projecting device which projects an image of an original document on the image reading unit;

a moving device which moves the image reading unit in a sub-scanning direction relative to the original document;

a magnification ratio detecting device which detects a magnification ratio of an image projected by the projecting device;

a sub-scanning travel speed controlling device which controls a travel speed in the sub-scanning direction by means of the moving device according to the detected magnification ratio; and an image forming unit which forms an image on a paper sheet based on data of an original document image read by the image reading unit.

In an embodiment of the present invention, the image forming unit has a photoreceptor.

In an embodiment of the present invention, an image forming device comprises a reference mark to be projected on the image reading unit by the projecting device.

In an embodiment of the present invention, the magnification ratio detecting device detects a projection magnification ratio of the projecting device by means of information of an image of the read reference mark.

In an embodiment of the present invention, the sub-scanning travel speed controlling device moves the image reading unit at a speed at which an image magnification ratio in the sub-scanning direction is the detected magnification ratio.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will be described in detail below based on the embodiments thereof with reference to the accompanying drawings.

Figure 1:
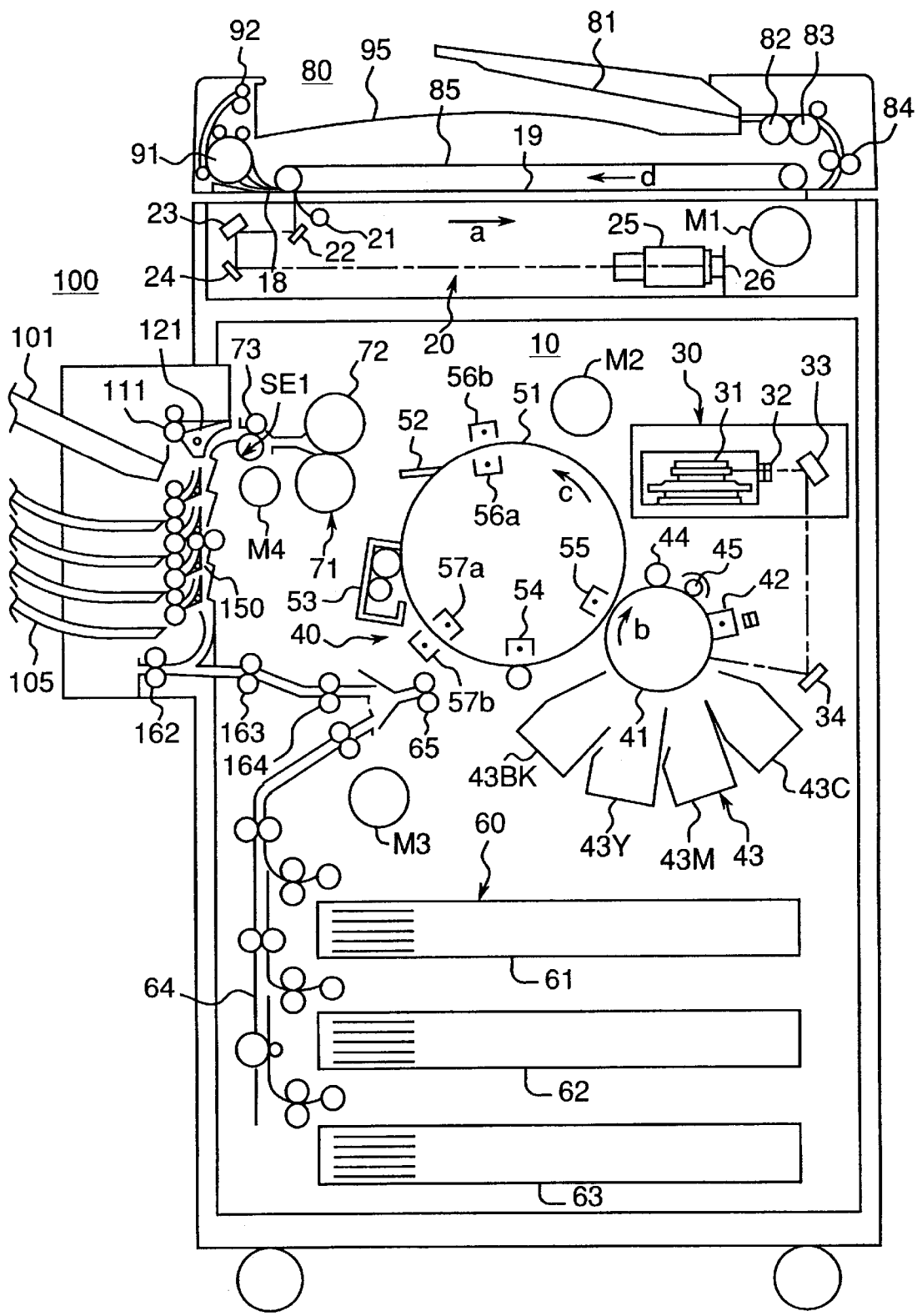
FIG. 1 is a diagram showing the overall construction of an electrophotographic copying machine having an image reading unit according to an embodiment of the present invention.

FIG. 1 shows the overall construction of an electrophotographic copying machine. This electrophotographic copying machine includes an image reading unit 20 which serves as an embodiment of the image reading device of the present invention. This copying machine is constructed of a digital-system full-color copying machine main body 10, an automatic document feeder 80 provided just above it and a duplex sorter 100 connected to a side portion of the copying machine main body 10.

The copying machine main body 10 has its upper portion provided with the image reading unit 20, its middle portion provided with a laser beam scanning unit 30 and a full-color image forming section 40 and its lower portion provided with a paper supplying section 60.

The image reading unit 20 is to read the image of an original document placed on an original document table glass 19 and is constructed of an exposure lamp 21, mirrors 22, 23 and 24, a zoom lens 25, a color CCD (Charge Coupled Device) 26 and a sub-scanning motor M1. The exposure lamp 21 and the mirror 22 move at a velocity v/m (m: copying magnification ratio) and the mirrors 23 and 24 move at a velocity v/2m with respect to a peripheral velocity v (constant no matter whether the magnification ratio is equal or varied) of a photoreceptor drum 41 each in a direction of arrow "a" so as to read the original document image. The original document is set on the original document table glass 19 with its end surface aligned with an original document scale 18 arranged on its left-hand side. Illumination light from the exposure lamp 21 is reflected on the original document surface and made incident on the CCD 26 via the mirrors 22, 23 and 24 and the lens 25. The CCD 26 reads the original document image as color signals of three primary colors of R (red), G (green) and B (blue). A multi-value electric signal obtained through photoelectric conversion by the CCD 26 is converted into 8-bit printing data corresponding to four colors of Y (yellow), M (magenta), C (cyan) and Bk (black) by an image signal processor 16 shown in FIG. 8, subjected to a necessary editing process and transmitted to a laser beam scanning unit 30.

The laser beam scanning unit 30 is a known one which forms an electrostatic latent image on the photoreceptor drum 41 rotating in a direction of arrow "b" by modulating a laser diode based on the printing data. A beam of laser light emitted from the laser diode is deflected by a polygon mirror 31 and applied to the photoreceptor drum 41 via an fθ-lens 32 and mirrors 33 and 34.

The full-color image forming section 40 is constructed mainly of the photoreceptor drum 41 and a transfer drum 51. Around the photoreceptor drum 41 are arranged an electrostatic charger 42, a full-color developing unit 43, a remaining toner cleaner 44 and a remaining electrostatic eraser 45 along its rotating direction (direction of arrow "b"). The developing unit 43 is provided with developers 43C, 43M, 43Y and 43Bk which store therein developing agents including toners of cyan, magenta, yellow and black, and every time the electrostatic latent image of each color is formed on the photoreceptor drum 41, the corresponding developer is driven.

The transfer drum 51 is arranged so as to be rotatably driven in a direction of arrow "c" at a peripheral velocity equal to that of the photoreceptor drum 41 and operates to transfer a toner image onto a recording paper wound around its surface. This transfer drum 51 is provided with a chucking pawl (not shown) for chucking the leading end of the recording paper, a separating pawl 52 for separating the recording paper and a remaining toner cleaner 53. The transfer drum 51 is internally and externally provided with a charger 54 for attracting the recording paper, a transfer charger 55 and electricity removing chargers 56a, 56b, 57a and 57b.

The transfer drum 51 has a circumferential dimension capable of chucking a recording paper of A3T, or the maximum size which can be copied.

The paper supplying section 60 is provided with triple paper supply cassettes 61, 62 and 63, and the recording paper is supplied from any one of the paper supply cassettes 61, 62 and 63, conveyed upward through a transfer path 64, stopped once by a timing roller pair 65, sent to the transfer drum 51 in accordance with a specified timing and chucked around it.

In a full-color copying process, images of cyan, magenta, yellow and black are successively formed on the photoreceptor drum 41, and the toner images are transferred onto the recording paper chucked on the transfer drum 51 by an electric discharge from the transfer charger 55 so as to be superimposed with one another. When the images of the four colors are superimposed with one another on the recording paper, electricity of the recording paper is removed by the electric discharge from the chargers 56a and 56b, and the recording paper is separated from the transfer drum 51 by the operation of the separating pawl 52. The separated recording paper is sent into a settling unit 71, subjected to toner fixing at a fixing roller pair 72 and thereafter sent through a discharging roller pair 73 into the duplex sorter 100.

It is to be noted that the present embodiment can form not only a full-color copy but also a single-color copy of one color and a color copy of two colors. The transfer drum 51 rotates according to the number of times of color superimposition.

The automatic document feeder 80 supplies and conveys the original document set on an original document stacker 81 one by one onto the original document table glass 19 and discharges the original document onto a tray 95 after completing the reading of the original document image by the image reading unit 20. In order to supply the original document from the stacker 81, it has a paper supplying roller 82, a handling roller pair 83 and a resist roller pair 84. The original document is set on the stacker 81 with the first page facing upward, supplied from the lowermost one (last page) by the paper supplying roller 82 and sent onto the original document table glass 19 through the roller pairs 83 and 84. In a position corresponding to the upper surface of the original document table glass 19 is forwardly and reversely rotatably arranged a conveyance belt 85 which rotates forwardly in a direction of arrow "d" to set the original document fed from the resist roller pair 84 onto the original document table glass 19 with the original document scale 18 served as a reference.

On the other hand, in a left-hand portion of the automatic document feeder 80 are arranged an original document discharging/reversing roller 91 and a discharging roller pair 92. In the case of a single-sided original document (document retaining an image only on its front surface), the conveyance belt 85 is rotated forwardly in the direction of arrow "d" after the completion of the image reading, and the single-sided original document is conveyed around the discharging/reversing roller 91 and discharged from the discharging roller pair 92 onto the tray 95 with its image retaining surface facing upward.

In the case of a double-sided original document (document retaining images on its front and rear surfaces), the double-sided original document sent from the resist roller pair 84 onto the original document table glass 19 passes over the original document table glass 19 without any process, makes one turn around the discharging/reversing roller 91 and then reversed. At the same time, the conveyance belt 85 is reversed to rotate in a direction opposite to the direction of arrow "d" to convey the reversed document so that the trailing end is aligned with the original document scale 18. In this stage, reading of the image on the rear surface of the original document is executed, and after the completion of the reading, the double-sided original document makes again one turn around the discharging/reversing roller 91 so as to be reversed. In this stage, the original document is set on the original document table glass 19 with its front surface facing downward, and the reading of the image on the front surface of the original document is executed. When the reading is completed, the original document is discharged with its front surface facing upward onto the tray 95 through the discharging/reversing roller 91 and the discharging roller pair 92.

Further, the automatic document feeder 80 can wholly pivot in the vertical direction with a rear portion of the copying machine main body 10 served as a fulcrum, thereby allowing the operator to manually set an original document on the original document table glass 19.

Figure 8:
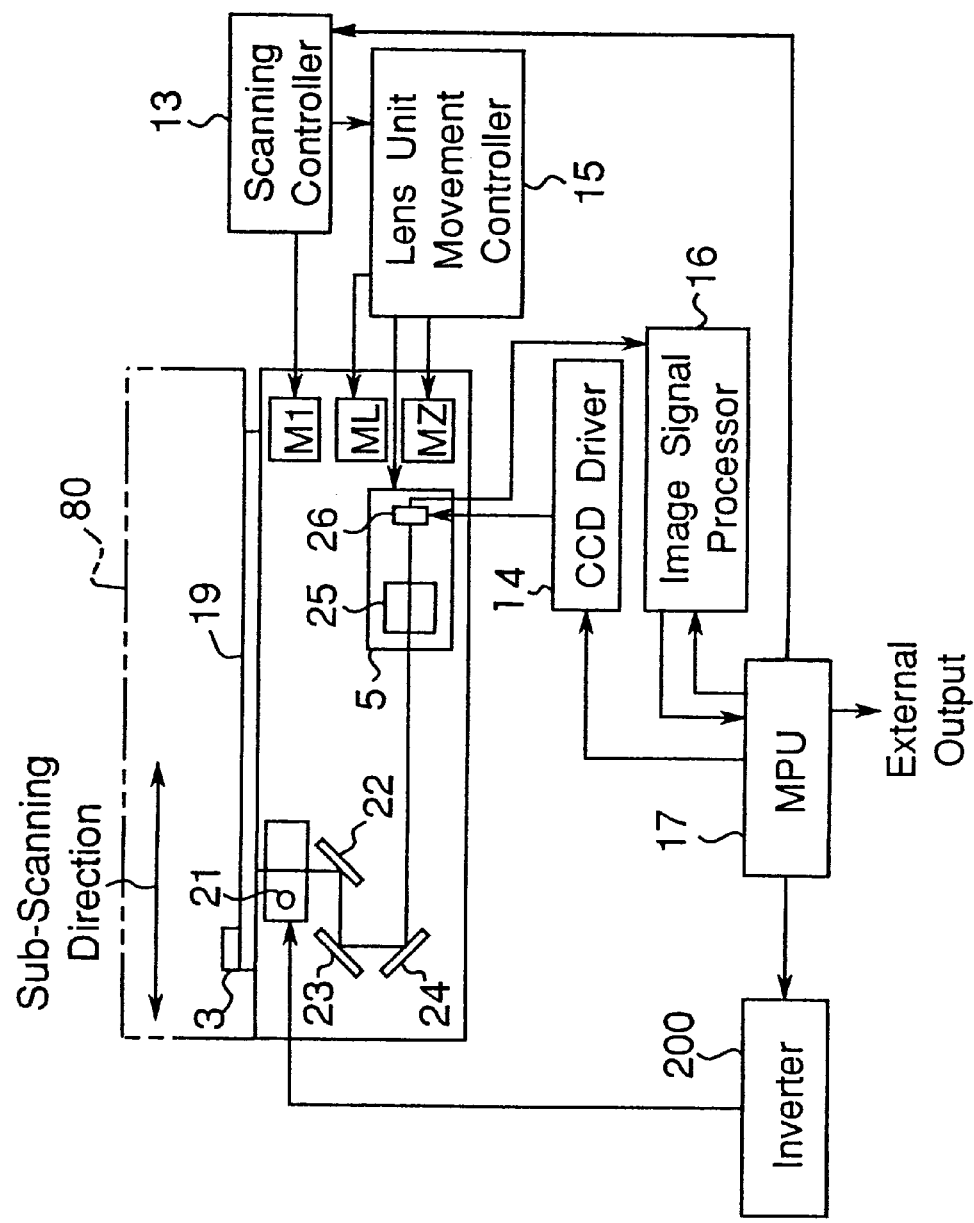
FIG. 8 is a block diagram of the above image reading unit.

The construction of the image reading unit 20 will be described in more detail next with reference to FIG. 8. The image reading unit 20 is provided with a reference pattern 3 fixed on the original document table glass 19. This reference pattern 3 is formed on the lower surface of the original document scale 18. A lens unit 5 has a zoom lens 25 and a CCD (Charge Coupled Device) 26 which serves as a light receiving section.

Figure 4:
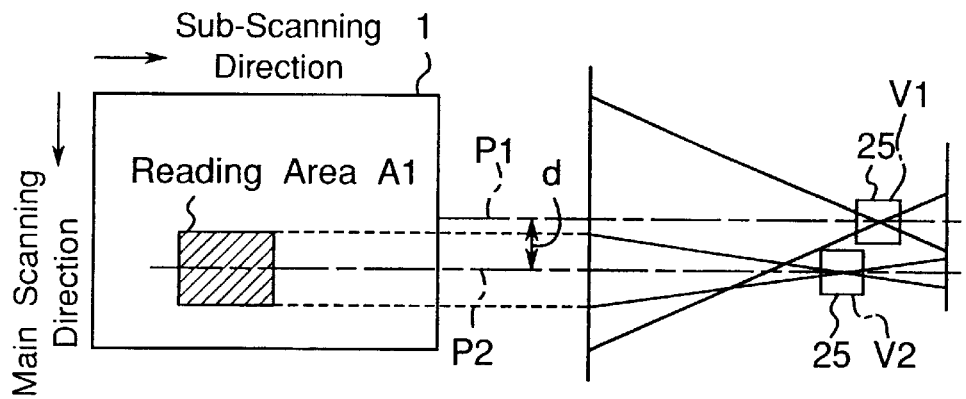
FIG. 4 is a schematic diagram for explaining the movement of a lens according to a reading area.

The zoom lens 25 projects an image on the CCD 26 on a reduced scale. The sub-scanning motor M1 provided for this embodiment is controlled by a scanning controller 13. This embodiment has a lens unit movement controller 15. This lens unit movement controller 15 drives a lens unit moving motor ML to allow the lens unit 5 to move in a main scanning direction perpendicular to the surface of the sheet of FIG. 8. As shown in FIG. 4, this lens unit movement controller 15 adjusts the optical axis of the zoom lens 25 to the center of a reading area A1 by moving the lens unit 5 in the main scanning direction. The lens unit movement controller 15 drives a zoom lens driving motor MZ to zoom the zoom lens 25 and set the projection magnification ratio of the zoom lens 25.

This embodiment further includes an image signal processor 16 for processing an image signal from the CCD 26 and an MPU (Micro Processing Unit) 17 which exchanges a signal with the image signal processor 16. This embodiment has a CCD driver 14 which drives the CCD 26 to control it upon receiving a control signal from the MPU 17. This embodiment is provided with an inverter 200 which drives the exposure lamp 21.

The sub-scanning motor M1 scans at full speed the reflection mirror 22 in parallel with the original document and scans at a half speed the reflection mirrors 23 and 24 in parallel with the original document. By this operation, sub-scanning is executed.

Figure 3:
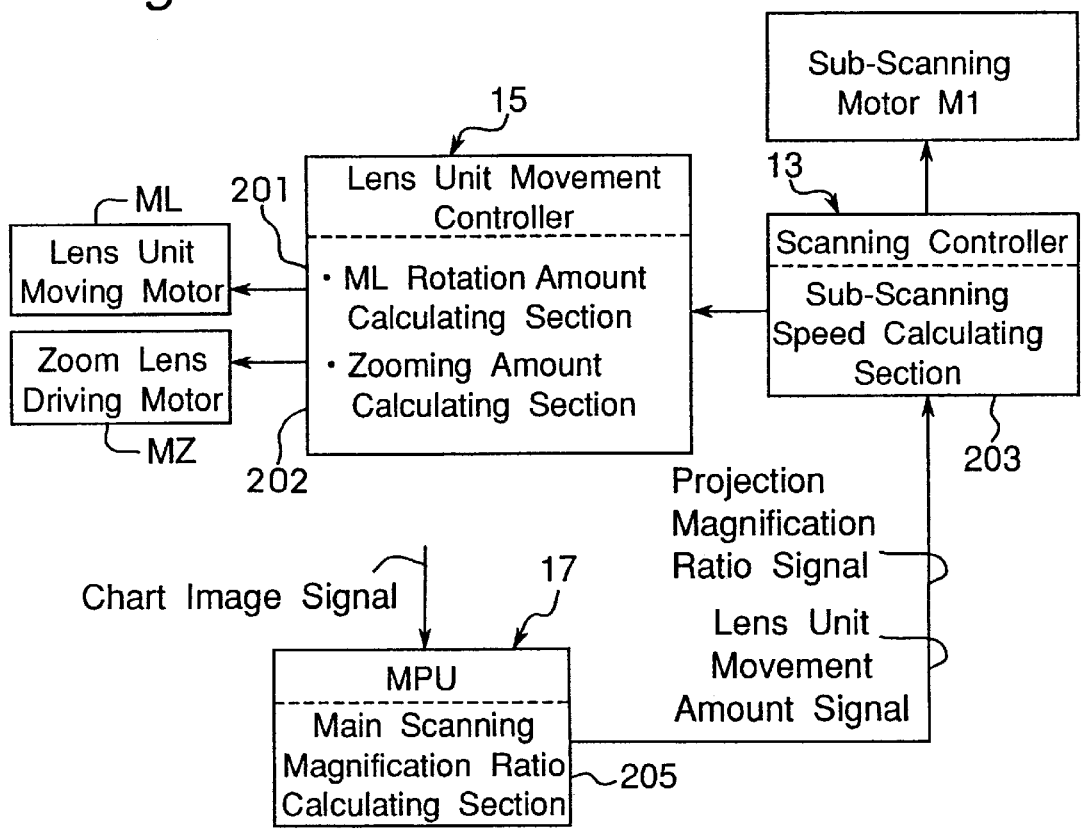
FIG. 3 is a block diagram of a part relevant to the sub-scanning of the above embodiment.

Next, FIG. 3 shows the constructions of the lens unit movement controller 15, the scanning controller 13 and the MPU 17. As shown in FIG. 3, the lens unit movement controller 15 has a lens unit moving motor rotation amount calculating section 201 and a zooming amount calculating section 202. The scanning controller 13 has a sub-scanning speed calculating section 203. The MPU 17 has a main scanning magnification ratio calculating section 205.

The lens unit moving motor rotation amount calculating section 201 calculates the amount of rotation of the lens unit moving motor ML. The zooming amount calculating section 202 calculates the amount of zooming of the zoom lens 25 according to a designated magnification ratio. The sub-scanning speed calculating section 203 calculates the sub-scanning speed according to the designated magnification ratio.

As shown in FIG. 4, the reading optical system of the image reading device having the above construction arranges the lens unit 5 constructed of the zoom lens 25 and the CCD 26 in a center position P1 (in a position V1) in the main scanning direction in the normal reading stage. When executing reading, a shading correction and a gain adjustment are executed in starting reading an original document 1 and thereafter the reading is started.

On the other hand, when executing reading on an enlarged scale, there are (1) a case where the original document 1 is read only by the zooming of the zoom lens 25 and (2) a case where the reading area A1 of the original document 1 is designated and this designated specific portion (reading area A1) is read on an enlarged scale. Herein is disclosed (2) the case where the reading area A1 is read on an enlarged scale. When executing the reading operation in this mode (2), reading conditions are set at a command from the MPU 17 as follows.

Figure 2:
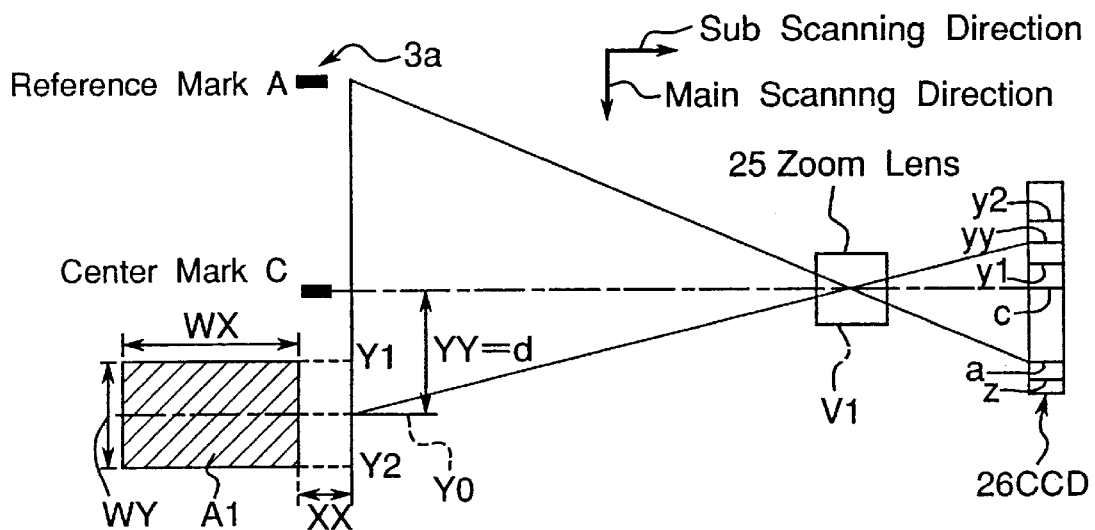
FIG. 2 is a diagram schematically showing a reading optical system of the above embodiment.
Figure 7:
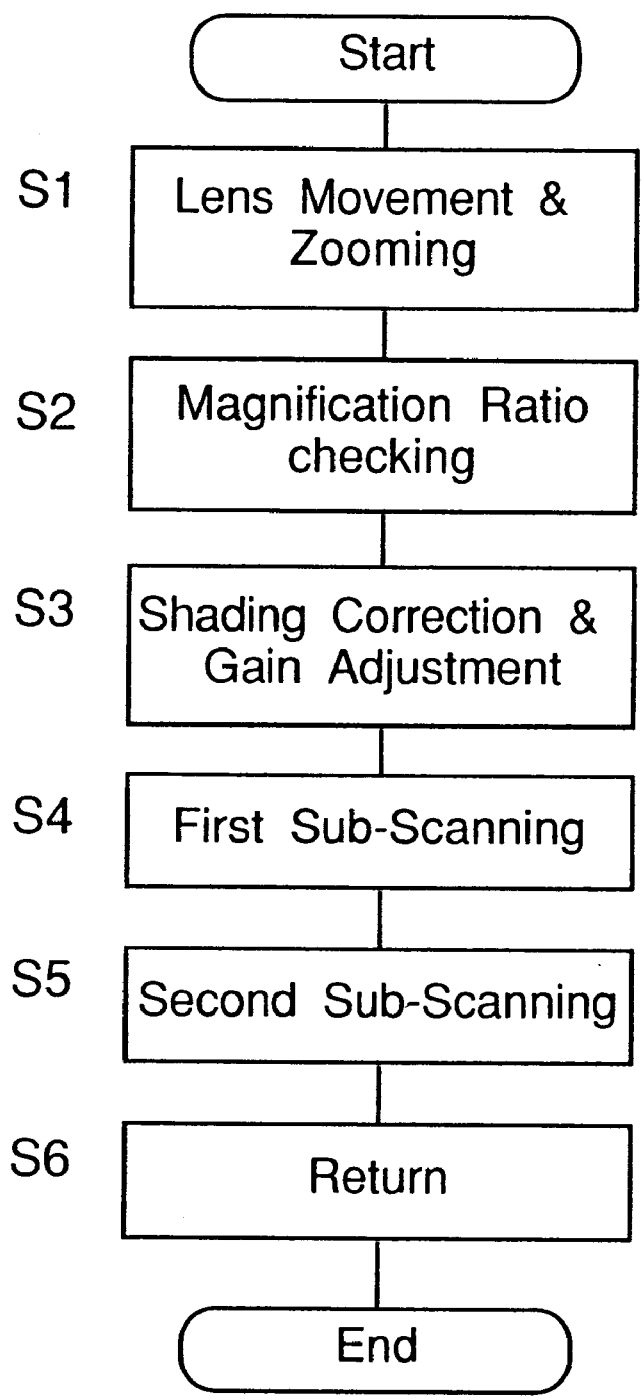
FIG. 7 is a flowchart showing the operation of the above embodiment.

First, as shown in FIG. 4, the lens unit movement controller 15 moves the optical axis of the zoom lens 25 of the lens unit 5 from the center position P1 in the initial stage to a center position P2 (in a position V2) of the reading area A1 according to the set reading area A1 (step S1 in FIG. 7). This movement in the main scanning direction is executed by rotating the lens unit moving motor ML by the amount of rotation calculated by the lens unit moving motor rotation amount calculating section 201. As shown in FIG. 2, a movement amount YY=d in the main scanning direction of the zoom lens 25 is calculated from the real address on the CCD 26 (linear sensor) of the image of the designated reading area A1 and inputted to the lens unit movement controller 15. The calculation of the movement amount d is executed by the MPU 17 and a lens unit movement amount signal representing the result of the calculation is transmitted via the scanning controller 13 to the lens unit movement controller 15.

In this stage, a control operation for moving the lens unit 5 in the main scanning direction will be described in detail below.

First, as shown in FIG. 2, an absolute reference pixel Z on the CCD 26 is set as a reading reference position, and the address of this reference pixel Z is stored in the image signal processor 16 in an adjusting stage on the assembly line.

Figure 9:
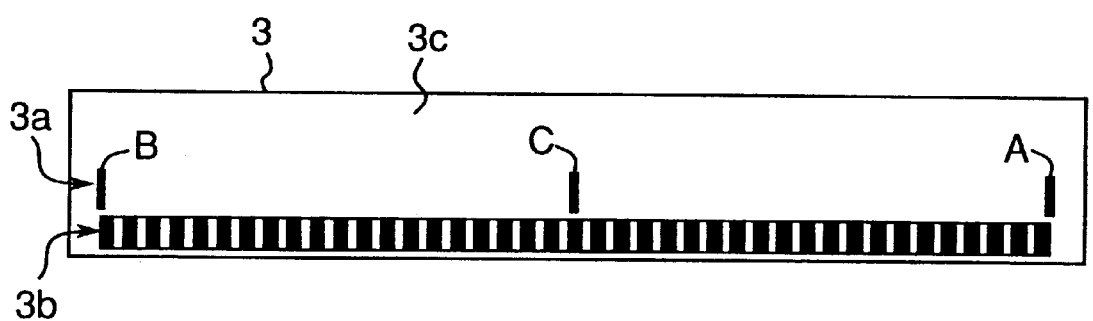
FIG. 9 is an enlarged view of a reference pattern of the above embodiment.

As shown in FIG. 9, the reference pattern 3 has a reference mark A corresponding to the reference position of the original document table glass 19 and a center mark C corresponding to the center in the widthwise direction of the original document table glass 19 within the line pattern 3a. With this arrangement, even when the position of the zoom lens 25 varies in the main scanning direction, a deviation amount of the head pixel of the CCD 26 from a reading start position can be detected from the absolute reference pixel Z of the CCD 26 and a projecting position "a" of the reference mark A on the CCD 26. Therefore, by adjusting the reading timing of the image data based on this deviation amount, a registration in the main scanning direction can be adjusted.

Prior to the image reading scanning, as shown in FIG. 2, the line pattern 3a of the reference pattern 3 is projected on the CCD 26 by the zoom lens 25 with its optical axis aligned with the center mark C of the reference pattern 3. According to the image data projected on the CCD 26, the addresses of the lines (reference mark A and center mark C) of the line pattern 3a, i.e., the addresses of pixels "a" and "c" are read into the image signal processor 16.

When designating the reading area A1, distances YY and XX from the center mark C of the reference pattern 3 which serves as the reference position of the original document to the reading area A1 and the widths WY and WX of the reading area A1 are set both in the main scanning direction and the sub-scanning direction.

Then, the image reading unit 20 replaces the distance YY and the width WY in the main scanning direction with address data of the corresponding pixels yy, y1 and y2 of the CCD 26 and stores the data into the image signal processor 16. By this operation, the address of the reading area A1 in the main scanning direction can be recognized by the address of the CCD 26 which constitutes a line sensor.

The image reading unit 20 replaces the distance XX and the width WX in the sub-scanning direction with count values of an encoder interlocked with a drive system and stores the data into the image signal processor 16.

Then, the image reading unit 20 drives the lens unit moving motor ML by means of the lens unit movement controller 15 prior to the image reading operation to move the lens unit 5 by a specified amount YY=d in the main scanning direction and zooms the zoom lens 25 by means of the zoom lens driving motor MZ to change the magnification ratio to a set value.

In the present embodiment, the lens unit 5 is put back to the initial reference position and the zoom lens 25 is put back into a reference magnification ratio state, and thereafter the lens unit 5 is moved to be adjusted to the reading area A1 as described above. Then, in this reference position state, the pixels "a" and "c" which belong to the CCD 26 and on which the reference mark A and the center mark C of the reference pattern 3 are projected are detected. Then, based on these detected pixels "a" and "c", the magnification ratio in the reference position state V1 and the projection position deviation amount from the absolute reference pixel Z of the reference mark A can be detected, so that the amount of movement of the lens unit 5 to be moved can be correctly calculated. Further, by executing the restoring operation into the reference position state, the possible accumulation of the positioning errors of the lens unit 5 is prevented, so that the reading position of the lens unit 5 can be correctly set.

By obtaining data such that the position of the reference mark A and the pixels y1 and y2 corresponding to the coordinate values at both ends in the main scanning direction of the reading area A1 can be known by means of, for example, something like an editor and designating the reading area A1, the positional variation of the zoom lens 25 prior to the movement of the lens unit 5 and the variation in magnification ratio setting are reflected on the designation of this reading area A1, so that the amount of movement of the lens unit 5 can be correctly obtained. Therefore, particularly when executing reading on an enlarged scale, no image loss occurs at both ends of the designated area.

Figure 10:
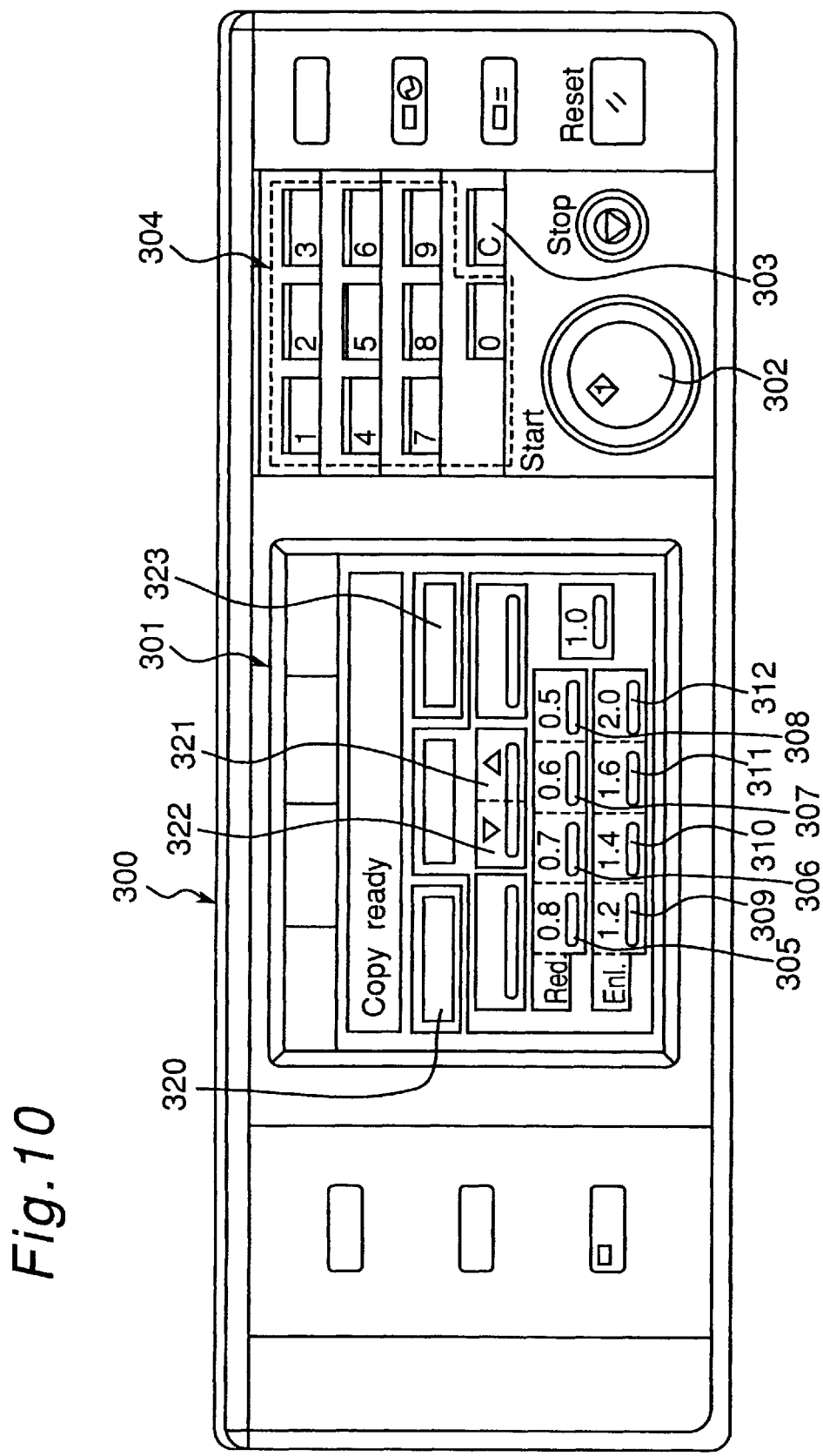
FIG. 10 is a plan view of an operation panel of the electrophotographic copying machine.

As shown in FIG. 4, the zoom lens 25 operates to zoom in the sub-scanning direction according to the designated magnification ratio at a command of the projection magnification ratio signal from the MPU 17, thereby changing the reading angle of view and a reading density (step S1 in FIG. 7). This zooming operation is controlled by the lens unit movement controller 15 and executed by driving the zoom lens driving motor MZ by the amount of zooming calculated by the zooming amount calculating section 202. This magnification ratio designation is executed by being set with an operation panel. Operations on an operation panel 300 provided for on the electrophotographic copying machine will be described with reference to FIG. 10. This operation panel 300 is provided with a touch panel 301 which serves as a display section, a start key 302, a clear key 303 and ten keys 304. In FIG. 10, the touch panel 301 serves as a display for setting a copying magnification ratio. On this display, when a key 305 is depressed, a magnification ratio of 0.8 is set, while magnification ratios of 0.7, 0.6, 0.5, 1.2, 1.4, 1.6 and 2.0 are set by depressing keys 306, 307, 308, 309, 310, 311 and 312, respectively. When an automatic magnification ratio key 320 is depressed, a magnification ratio is automatically set according to the selected paper sheet. When a magnification ratio increasing key 321 or a magnification ratio decreasing key 322 is depressed, the magnification ratio can be changed in steps of 0.001. When a ten-key setting key 323 is depressed, the copying magnification ratio can be directly set by means of the ten keys 304.

Next, at a command from the MPU 17, the image signal processor 16 executes magnification ratio checking (step S2) and executes shading correction and gain adjustment, thereby effecting correction so that no influence is exerted from a light quantity distribution variation within the reading angle of view due to a change in the reading range (step S3 in FIG. 7).

A magnification ratio detecting operation and a sub-scanning speed correcting operation is described herein. As described above, when the reading area A1 and the designated magnification ratio are given, the image reading unit 20 moves the lens unit 5 in the main scanning direction to a center position Y0 of the reading area A1 and executes the zooming operation of the zoom lens 25 according to the designated magnification ratio. In this stage, when the zoom lens is driven by a motor or the like according to a general method, a focal distance adjustment error is caused by an error owned by the mechanical system, and consequently a magnification ratio setting error occurs. Therefore, according to this embodiment, the following correction is executed by means of the reference pattern 3 shown in FIG. 9, thereby suppressing the magnification ratio setting error.

That is, an image signal of the image obtained by projecting on the CCD 26 the line marks A, B and C which are formed at specified intervals and owned by the line pattern 3a of the reference pattern 3 by means of the zoom lens 25 is transmitted from the image signal processor 16 to the MPU 17. The MPU 17 detects an edge portion of the projection image and obtains a distance between edges of the read line pattern 3a from the edge portion of the projection image. Then, the MPU 17 calculates the actual reading magnification ratio by comparing the read distance between edges of the line pattern 3a to the measured values of the distances between the known line marks A, B and C. Then, the MPU 17 transmits the calculated actual reading magnification ratio as a magnification ratio signal to the scanning controller 13, and the sub-scanning speed calculating section 203 of this scanning controller 13 calculates a sub-scanning speed corresponding to the actual reading magnification ratio. Then, the sub-scanning motor M1 is driven by this calculated sub-scanning speed. Therefore, according to the present embodiment, the sub-scanning speed corresponding to the actual projection magnification ratio can be set regardless of the presence or absence of the magnification ratio error attributed to the mechanical error on the lens side in the zooming stage, so that the disorder of the aspect ratio of the pixels can be prevented, thereby allowing an accurate image to be obtained.

In this stage, a ladder pattern 3b of the reference pattern 3 shown in FIG. 9 is read, MTF (Modulation Transfer Function) is calculated from the result of reading this ladder pattern 3b and it is checked whether or not irregular defocusing of the lens system is occurring.

In this stage, when the calculated MTF value is satisfies a specified value, it is decided that the MTF valve is in an appropriate state, and a sub-scanning speed parameter is set based on the previously obtained reading magnification ratio. Further, the reference pattern 3 has a white ground portion 3c whose reflectance is controlled. By reading the area of this white ground portion 3c, the shading correction of the data read by the CCD 26 which constitutes a line sensor, is executed, and the gain of the line sensor is adjusted to an appropriate value.

By executing the shading correction and gain adjustment as described above, the uniformity of the reading image quality can be maintained even when the illumination condition viewed from the CCD 26 side is significantly varied due to the arbitrary designation of the reading area A1 and the reading magnification ratio as stated before.

When the sub-scanning speed is used for the adjustment of the magnification ratio as in this embodiment, the magnification ratio can be continuously adjusted and there is no need for increasing the mechanical accuracy more than necessary or requiring any adjustment mechanism, therefore allowing the construction to be simplified.

By the operations of step S1 through step S3, image deteriorating factors due to the MTF characteristic of the lens and the magnification ratio chromatic aberration can be brought into advantageous conditions within a range which can be set.

Figure 5:
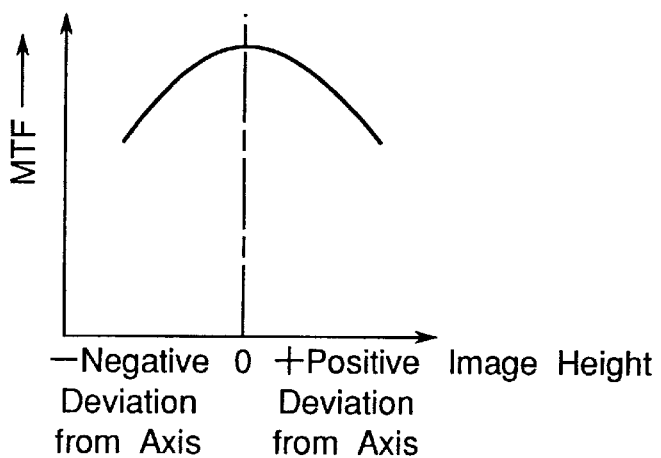
FIG. 5 is a graph of a characteristic curve representing a relation between an image height and MTF (Modulation Transfer Function)

That is, the optical axis of the zoom lens 25 can be made to coincide with the center position P2 of the set reading area A1 shown in FIG. 4 by the operation of step S1. Therefore, the zoom lens 25 can be used at a small angle of view, and the original document 1 can be regarded as symmetrical about the optical axis of the lens in the direction of the angle of view. Therefore, as shown in FIG. 5, the MTF characteristic of the lens which varies according to the image height and has a tendency of reducing as it deviates from the axis can be set approximately at maximum.

Figure 6:
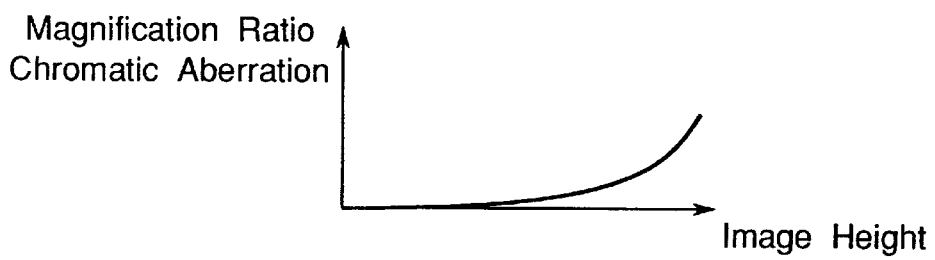
FIG. 6 is a graph of a characteristic curve representing a relation between the image height and a magnification ratio chromatic aberration.

Furthermore, as shown in FIG. 6, the amount of occurrence of the magnification ratio chromatic aberration generally increases as it deviates from the axis, and when this amount of occurrence exceeds a specified rate with respect to the reading pixel size, it causes a color shift. Therefore, by reducing the image height as far as possible, the magnification ratio chromatic aberration can be made small to allow the image quality to be controlled in a more stable state.

Furthermore, as stated before, in regard to the sub-scanning speed of the image, the actual projection magnification ratio is detected from the image obtained by projecting on the CCD 26 the reference mark for detecting the magnification ratio, i.e., the reference pattern 3 shown in FIG. 9, and the sub-scanning speed is determined on the basis of this detected actual projection magnification ratio. By this operation, the mechanical error on the lens side in the zooming stage is absorbed, so that the accuracy of the image quality can be guaranteed. As shown in FIG. 9, the reference pattern 3 has the line pattern 3a and the ladder pattern 3b of great and small intervals, and the magnification ratio is detected by the projection image of this line pattern 3a.

Furthermore, the scanning system is set so as to move at high speed from the start position to the vicinity of the reading area A1 (first sub-scanning in step S4) and move at a sub-scanning speed corresponding to the magnification ratio in the reading area A1 (second sub-scanning in step S5) according to the position of the reading area A1 in the sub-scanning direction. Then the system returns to perform another operation (step S6). With this arrangement, the magnification ratio can be automatically set to the maximum resolution which can be set by a magnification ratio varying system while being interlocked with the movement and the zooming of the zoom lens 25 in correspondence with the designation of the arbitrary reading area A1.

Although the zoom lens 25 is used as the projection lens and the projection magnification ratio is varied by zooming the zoom lens according to the description of the aforementioned embodiment, the projection lens may be a single-focus lens. In this case, the projection magnification ratio is varied by moving the single-focus lens in the sub-scanning direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image reading device comprising:
   an image reading unit which extends in a main scanning direction;
   a projecting device which projects an image of an original document on the image reading unit;
   a moving device which moves the image reading unit in a sub-scanning direction relative to the original document;
   a magnification ratio detecting device which detects a magnification ratio of an image projected by the projecting device; and
   a sub-scanning travel speed controlling device which controls a travel speed in the sub-scanning direction by means of the moving device according to the detected magnification ratio.

2. An image reading device as claimed in claim 1, wherein the image reading unit is a plurality of CCDs arranged in a linear form.

3. An image reading device as claimed in claim 1, wherein the projecting device is a zoom lens.

4. An image reading device as claimed in claim 1, wherein the projecting device has a projection lens having a single focus and is able to change its projection magnification ratio by varying its conjugation length.

5. An image reading device as claimed in claim 1, further comprising:
   a designating device which designates the projection magnification ratio of the projecting device; and
   a lens moving device which moves a lens included in the projecting device according to the designated magnification ratio.

6. An image reading device as claimed in claim 1, comprising:
   a reference mark to be projected on the image reading unit by the projecting device.

7. An image reading device as claimed in claim 6, wherein the magnification ratio detecting device detects the projection magnification ratio of the projecting device by means of information of an image of the reference mark.

8. An image reading device as claimed in claim 7, wherein the sub-scanning travel speed controlling device controls the moving device so that the image reading unit moves at a speed at which an image magnification ratio in the sub-scanning direction is the detected magnification ratio.

9. An image reading device comprising:

a line sensor which extends in a main scanning direction;

a zoom lens which projects an image of an original document on the line sensor while varying a projection magnification ratio;

a reference pattern arranged in the vicinity of the original document;

a moving device which moves the line sensor in a sub-scanning direction relative to the original document;

a magnification ratio designating device which designates a projection magnification ratio of the zoom lens;

a zooming device which executes zooming of the zoom lens according to the magnification ratio designated by the magnification ratio designating device;

a reading device which reads an image of the reference pattern projected by the zoomed zoom lens by means of the line sensor;

a magnification ratio calculating device which calculates a projection magnification ratio according to image information obtained by the reading device; and a sub-scanning travel speed controlling device which controls the moving device so that the line sensor moves in the sub-scanning direction relative to the original document at a speed corresponding to the calculated projection magnification ratio.

10. An image reading device as claimed in claim 9, wherein the line sensor has a plurality of CCDs.

11. An image reading device as claimed in claim 9, comprising:

a reference mark to be projected on the line sensor by the projecting device.

12. An image reading device as claimed in claim 11, wherein the magnification ratio calculating device detects the projection magnification ratio of the zoom lens by means of information of an image of the read reference mark.

13. An image reading device as claimed in claim 12, wherein the sub-scanning travel speed controlling device controls the moving device so that the line sensor moves at a speed at which an image magnification ratio in the sub-scanning direction is the detected magnification ratio.

14. An image reading device comprising:

a line sensor which extends in a main scanning direction;

a projection lens which projects an image of an original document on the line sensor;

a reference pattern arranged in the vicinity of the original document;

a sensor moving device which moves the line sensor in a sub-scanning direction relative to the original document;

a magnification ratio designating device which designates a projection magnification ratio of the projection lens;

a lens moving device which moves the projection lens according to a magnification ratio designated by the magnification ratio designating device;

a reading device which reads an image of the reference pattern projected by the moved projection lens by means of the line sensor;

a magnification ratio calculating device which calculates a projection magnification ratio according to image information obtained by the reading device; and a sub-scanning travel speed controlling device which controls the moving device so that the line sensor moves in the sub-scanning direction relative to the original document at a speed corresponding to the calculated projection magnification ratio.

15. An image reading device as claimed in claim 14, wherein the line sensor has a plurality of CCDs.

16. An image reading device as claimed in claim 14, further comprising:

a reference mark to be projected on the image reading unit by the projection lens.

17. An image reading device as claimed in claim 16, wherein the magnification ratio calculating device detects the projection magnification ratio of the projection lens by means of information of an image of the read reference mark.

18. An image reading device as claimed in claim 17, wherein the sub-scanning travel speed controlling device controls the sensor moving device so that the line sensor moves at a speed at which an image magnification ratio in the sub-scanning direction is the detected magnification ratio.

19. An image forming device comprising:

an image reading unit which extends in a main scanning direction;

a projecting device which projects an image of an original document on the image reading unit;

a moving device which moves the image reading unit in a sub-scanning direction relative to the original document;

a magnification ratio detecting device which detects a magnification ratio of an image projected by the projecting device;

a sub-scanning travel speed controlling device which controls a travel speed in the sub-scanning direction by means of the moving device according to the detected magnification ratio; and an image forming unit which forms an image on a paper sheet based on data of an original document image read by the image reading unit.

20. An image forming device as claimed in claim 19, wherein the image forming unit has a photoreceptor.

21. An image forming device as claimed in claim 19, comprising:

a reference mark to be projected on the image reading unit by the projecting device.

22. An image forming device as claimed in claim 21, wherein the magnification ratio detecting device detects a projection magnification ratio of the projecting device by means of information of an image of the read reference mark.

23. An image forming device as claimed in claim 22, wherein the sub-scanning travel speed controlling device controls the moving device so that the image reading unit moves at a speed at which an image magnification ratio in the sub-scanning direction is the detected magnification ratio.

* * * * *